US 8,970,587 B2

(12) United States Patent
Nilsson et al.

(10) Patent No.: US 8,970,587 B2
(45) Date of Patent: Mar. 3, 2015

(54) FIVE-DIMENSIONAL OCCLUSION QUERIES

(75) Inventors: Jim K. Nilsson, Lund (SE); Tomas G. Akenine-Möller, Lund (SE)

(73) Assignee: Intel Corporation, Santa Clara, CA (US)

(*) Notice: Subject to any disclaimer, the term of this patent is extended or adjusted under 35 U.S.C. 154(b) by 253 days.

(21) Appl. No.: 13/569,416

(22) Filed: Aug. 8, 2012

(65) Prior Publication Data
US 2013/0181991 A1    Jul. 18, 2013

Related U.S. Application Data

(60) Provisional application No. 61/586,965, filed on Jan. 16, 2012.

(51) Int. Cl.
*G06T 15/40*    (2011.01)

(52) U.S. Cl.
USPC .......................................................... 345/421

(58) Field of Classification Search
CPC ......... G06T 15/00; G06T 15/40; G06T 7/004; H04N 2213/005
USPC .......................................................... 345/421
See application file for complete search history.

(56) References Cited

U.S. PATENT DOCUMENTS

2003/0043148 A1* 3/2003 Mei et al. .................... 345/421
2004/0061699 A1* 4/2004 Tjew ........................... 345/421

OTHER PUBLICATIONS

McGuire et al., Real-time Stochastic Rasterization on Conventional GPU Architectures, High Performance Graphics (2010), 2010, pp. 173-182.*

Akenine-Moller, T., et al., "Efficient Depth of Field Rasterization using a Tile Test Based on Half-Space Culling", Computer Graphics Forum, 14 pages, Retrieved from Lund University, Department of Computer Science website Jan. 9, 2013.
Akenine-Moller, T., et al., "Graphics for the Masses", ACM Transactions on Graphics (Proceedings of ACM SIGGRAPH), vol. 22, No. 3, pp. 511-520, 2003.
Akenine-Moller, T., et al., "Stochastic Rasterization using Time-Continuous Triangles", Graphics Hardware 2007, 11 pages.
Boulos, S., et al., "Space-timeHierarchical Occlusion Culling for Micropolygon Rendering with Motion Blur," 8 pages, Retrieved from Internet Jan. 9, 2013 http://graphics.stanford.edu/papers/tzpyramid/tzpyramid.pdf.
Greene, N. et al., "Hierarchical Z-buffer Visibility," Proceedings of SIGGRAPH 93, pp. 231-238, 2003.
Laine, S., et al., "Clipless, Dual-Space Bounds for Faster Stochastic Rasterization", ACM Transactions on Graphics, vol. 30, No. 4 pp. 106:1-106:6, 2011.
Munkberg, J., et al., "Hierarchical Stochastic Motion Blur Rasterization," 11 pages, Retrieved from Lund University, Department of Computer Science website Jan. 9, 2013.

* cited by examiner

*Primary Examiner* — Kee M Tung
*Assistant Examiner* — Haixia Du
(74) *Attorney, Agent, or Firm* — Trop, Pruner & Hu, P.C.

(57) ABSTRACT

A standard occlusion query (OQ) may be generalized to five dimensions, which can be used for motion blurred, defocused, occlusion culling. As such, the occlusion query concept is generalized so that it can be used within 5D rasterization, which is used for rendering of motion blur and depth of field. For 5D rasterization, occlusion culling may be done with OQs as well, applied to solve other rendering related problems.

21 Claims, 5 Drawing Sheets

FIVE-DIMENSIONAL OCCLUSION QUERIES

CROSS-REFERENCE TO RELATED APPLICATION

This is a non-provisional application claiming priority to provisional application Ser. No. 61/586,965 filed on Jan. 16, 2012 hereby expressly incorporated by reference herein.

BACKGROUND

Implementations may relate to the field of graphics processing.

BRIEF DESCRIPTION OF THE DRAWINGS

Some embodiments are described with respect to the following figures.

DETAILED DESCRIPTION

Briefly, an occlusion query (OQ) can be used to find out how many fragments, n, generated by a set of polygons, pass the depth test. For example, the faces of a bounding box around a complex character can be used as an occlusion query, and if n is zero then no fragments pass, and hence the character is occluded with respect to the contents of the depth buffer.

Thus the OQ is used for occlusion culling which can give much better rendering performance. However, it should be noted that game developers and researchers have found many other uses for OQs as well. An example is that graphics processors with OQs have been used for image-based collision detection.

A straightforward way to extend occlusion queries (OQ), to account for motion and defocus blur, is to render the object to the depth buffer using the samples of the pixels, and let the five-dimensional (5D) rasterizer count the number of fragments that pass the test, i.e., in the traditional sense. This is called a sample-based OQ.

For motion blur and defocus blur, a relatively large number of samples (e.g., s=16 or s=64) per pixel may be needed for sample based OQ. Performing s sample-inside-triangle tests, s depth calculations, and s depth tests per pixel, may be what some applications desire. However, this is very expensive, both in terms of computations and memory bandwidth usage.

Figure 1:
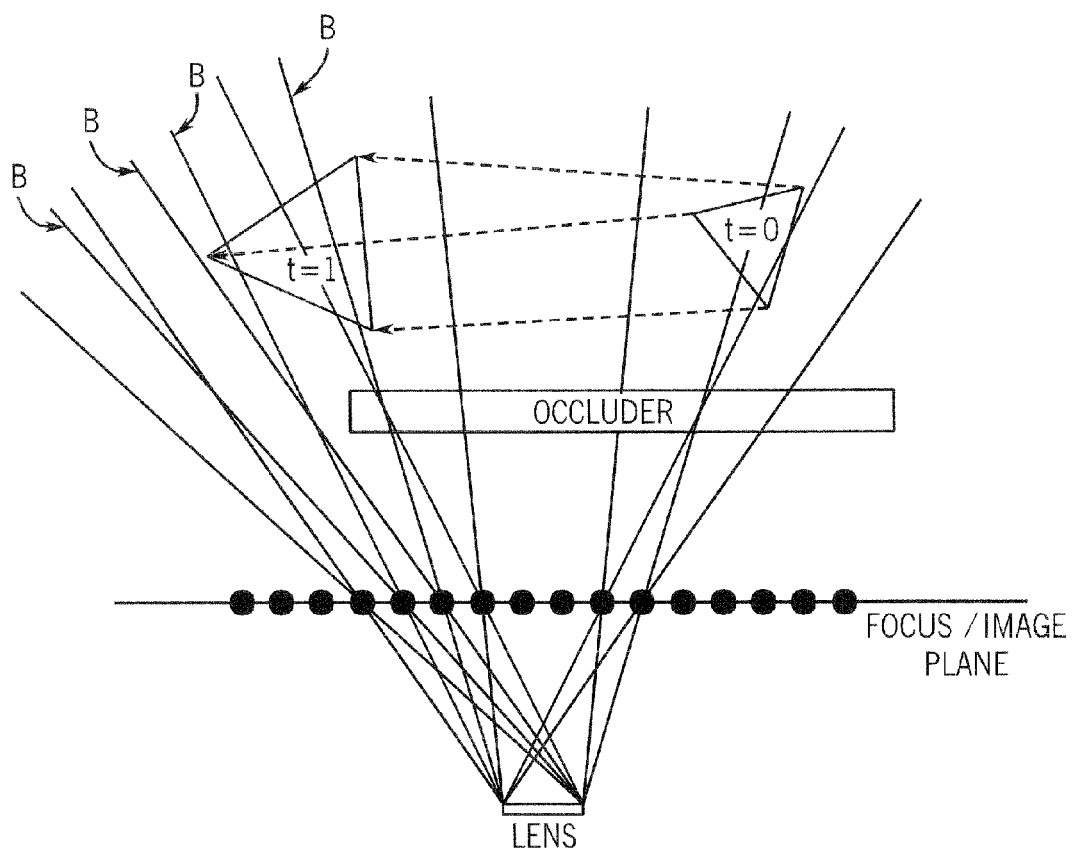
FIG. 1 is an example of a 5D occlusion query in time interval $0 \le t \le 1$, according to one embodiment.

Various embodiments provide a much faster type of occlusion query in one embodiment, which is conservative (meaning it never gives wrong renderings). The occlusion query (OQ) can be generalized to five dimensions, (x, y, u, v, t) which can be used for motion blurred, defocused, occlusion culling. As such, the occlusion query concept can be generalized so that it can be used within 5D rasterization which can be used for rendering of motion blur and depth of field. See FIG. 1, for example. For 5D rasterization, occlusion culling with OQs could be performed as well, and applied in order to solve other rendering related problems.

In Zmax-culling, for each tile (a rectangular block of pixels/samples, e.g., 8×8 pixels), the maximum of the depth values of the tile, Zmax, is stored in a fast memory. When a triangle is being rendered, the pixels that the triangle covers are visited using a tile-based traversal order. For each tile being visited, a conservative estimate of the minimum depth, called depth Zmin_triangle, over the triangle over the current tile, is computed. If Zmin_triangle is greater than Zmax, then the triangle is hidden for the entire tile, and therefore, no more processing needs to be done for that tile/triangle. This makes the rendering of occluded geometry much faster.

Zmin of the tile can be used for different depth tests, and sometimes, it can even be used to avoid depth reads when the triangle in the tile is definitely in front of the contents of the depth buffer. In the following, only Zmax is described, but the same applies for Zmin.

For three-dimensional (3D) rasterization, e.g. used to render motion blur, there can be several Zmax-values per tile. Note that each sample now has a time, t, as well. Hence, each sample consists of x, y, t. Assume, for example, that two Zmax-values are used per tile. The first Zmax-value could be the maximum of all depths with $0<=t<0.5$, and the second Zmax-value would then be the maximum for all samples with $0.5<=t<1.0$. When the triangle is being rasterized with motion blur, a tiled-based rasterizer will return a time interval, Ti, during which the triangle covers some part of the tile. For example, if this time interval is Ti=[0.6, 0.8], which means $0.6<t<0.8$, then comparison against the second Zmax-value, which is valid for $0.5<t<1.0$, would take place.

In addition to x and y screen coordinates, a four-dimensional (4D) rasterizer uses two dimensions u and v, which are lens parameters describing a point on a lens (used to render depth of field). For a full 5D rasterizer, x and y could be the first two dimensions, and then u, v, t can be used as well.

In the following, 5D Zmax-culling is described. Recall that one tile is processed at a time, and that a tile is a rectangular block of pixels/samples. Also assume that all u, v, t values vary between 0.0 and 1.0 to simplify this discussion, but other values may also be used.

In 5D, each sample includes of x, y, u, v, t parameters. Take all the samples in a tile and look at the u, v, t points in a cube with the axes u and v and t (instead of the usual x and y and z). This cube can be split along each of the axes. Split the u axis into U segments, the v-axis into V segments, and the t-axis into T segments. This would generate U*V*T smaller, non-overlapping boxes, that together cover the entire cube, $0 \le u, v, t \le 1$. For each such box in uvt-space, the maximum depth is found and stored in a Zmax-variable for that box (and is updated as more triangles are rendered to the depth buffer).

When a tile-based rasterizer is used, the tile test will return intervals for u, v, and t, and those values can be used to detect which boxes' Zmax-values used in the Zmax-culling. Call these intervals, Ui, Vi, and Ti. Note that for the entire cube, $0 \le u,v,t \le 1$, a Zmax-value, i.e., the maximum depth for all samples in the tile, can also be computed. In addition, this can be done hierarchically so that the Zmax-value can be computed if needed (for example, for 2*2*2 adjacent boxes). Sometimes, culling can be done more efficiently if such a hierarchy of Zmax-values is used. Note that the graphics processor updates the Zmax-values as new triangles are rasterized to each tile.

Figure 2:
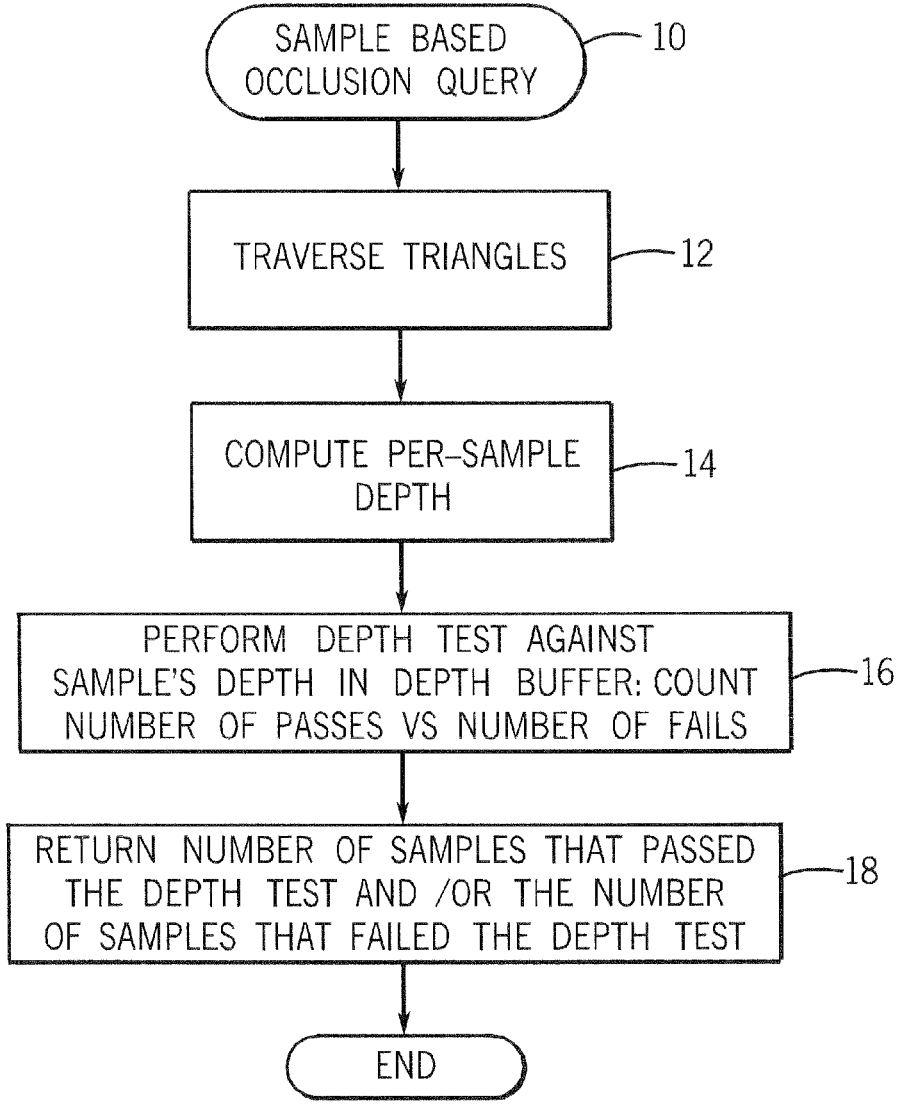
FIG. 2 is a flow chart for a sequence for a sample based occlusion query according to one embodiment.

A sequence 10, shown in FIG. 2, for a sample based occlusion query according to one embodiment may be implemented in software, firmware and/or hardware. In software and firmware embodiments it may be implemented by instructions for execution by a computer processor stored in one or more non-transitory computer readable media such as an optical, magnetic or semiconductor storage.

The sequence shown in FIG. 2 may begin by traversing triangles as indicated in block 12. Then the per sample depth is computed as indicated in block 14. Next the depth test is performed against the sample depths in the depth buffer. The number of passes may be counted versus the number of fails as indicated in block 16. Finally the number of samples that passed the depth test and/or the number of samples that failed the depth test are returned as indicated in block 18. If no samples pass the depth test, then all samples are occluded, and therefore one can use this as a test of whether a complex character, for example, is occluded. This is usually done by just rendering an OQ which is the bounding box of the character.

Next, a relaxed occlusion query (OQ) is described. Exploiting the fact that for occlusion culling, and many other applications of OQ, you only need to know whether the geometry associated with the OQ is hidden with respect to the content of the depth buffer or not. Knowing how "much" the geometry is occluded might not be needed. The relaxed OQ can be much faster than the sample-based OQ, described above, exploiting this fact. This means that the individual samples (e.g., 16 or 64 samples per pixel) of each pixel in a tile are not used, and the following may not be performed: a sample-inside-triangle test for each sample, depth computation per sample, and depth test per sample (which involves reading depth buffer values).

As mentioned above, a tile-based traversal order provides intervals in u, v, and t. Also a depth interval, Zi may be computed, for a motion-blurred, defocused triangle. The relaxed OQ traverses each triangle of the geometry being tested for occlusion, and for each tile that the rasterizer visits, the tile test computes intervals in u, v, t, and depth, z. The u, v, t intervals, Ui, Vi, Ti, are used to detect which Zmax-values in the uvt-cube of small boxes or volumes that need to be considered, where each box has a Zmax-value as previously mentioned. The depth interval of the moving, defocused triangle is compared against these Zmax-values. Put another way, the depth interval of the triangle consists of a $Zmin_{triangle}$, and a Zmax_triangle, and if $Zmin_{triangle}$>Zmax_box, where Zmax_box is the maximum depth of a box in the uvt-cube, then the triangle is occluded for the corresponding u, v, t-intervals. Recall that each box resides in uvt-space and therefore represents intervals in u, v, and t. Such a comparison may be done for each of the boxes in the uvt-cube that overlaps with the intervals (u, v, and t) from the tile test. If all these tests are true, then the moving, defocused triangle is occluded for that tile.

Now, as soon as one comparison is false, i.e., Zmin_triangle<=Zmax_box, then the geometry will not be fully occluded (in a conservative manner), and therefore, we can abort the rest of the processing in the OQ. There is no need to count the samples, because all that the system needs to know is whether or not it is occluded, and in this case, one can never say that it is occluded, and therefore, the processing is aborted, and the flow returns that it is possibly visible.

Only the Zmax-values for 5D rasterization are described here. For 4D, a square in the uv-plane may be used. That square may be split into small rectangles, and Zmax may be computed for these rectangles. For 3D, one would use a line along the t-axis, and split it into intervals, and compute the Zmax for the samples in each interval. The relaxed occlusion query also works in 2D. In that case, no intervals in terms of u, v, or t are obtained, so the Zmin_triangle is compared against the Zmax of the tile.

Also, even though the tile size is fixed to, say, W*H pixels, and each such tile needs a Zmax-representation (such as the ones we have described above), the traversal can actually choose to traverse the screen space either using a different tile size, e.g., W/2*H/2, since that may give better occlusion culling performance, or using bigger tiles, e.g., 2*W*2*H, since that will use fewer computations.

Figure 3:
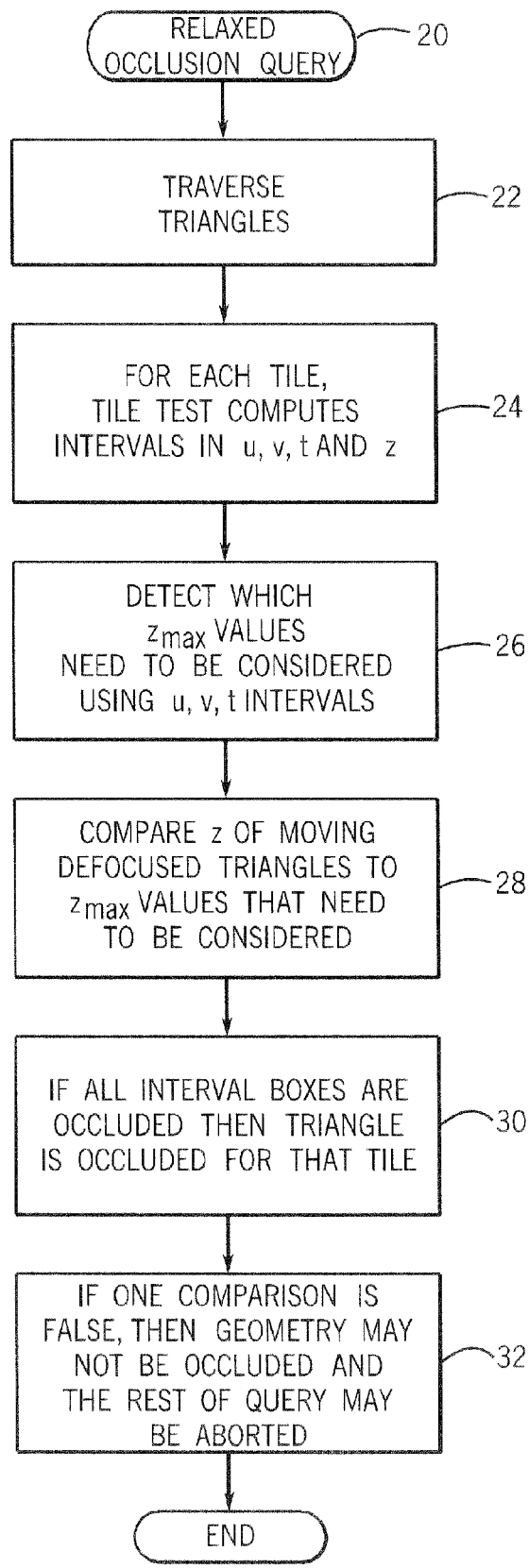
FIG. 3 is a flow chart for a sequence for a relaxed occlusion query according to the one embodiment.

The sequence 20, shown in FIG. 3, may implement the relaxed occlusion query according to some embodiments. It may be implemented in software, firmware, and/or hardware. In software and firmware embodiments it may be implemented by computer executed instructions stored in one or more computer readable media such as a magnetic, optical or semiconductor storage.

The sequence begins by traversing the triangles as indicated in block 22. For each tile, a tile test computes the intervals u, v, t and z as indicated in block 24. Then in block 26, it is determined which Zmax values need to be considered using the u, v, and t intervals. Then the z of a moving defocused triangle is compared to the Zmax values that need to be considered as indicated in block 30. If all the interval boxes are occluded, then the triangle is occluded for that tile as indicated at 30. If one comparison is false then the geometry may not be occluded and the rest of the occlusion query processing may be aborted in one embodiment as indicated in block 32.

General pseudo code can be found below, where we assume that one triangle is being rasterized:

```
RelaxedOcclusionQuery:
loop over (at least) all tiles that overlaps with the triangle in 2D, 3D, 4D,
or 5D:
{
  bool overlap=ComputeTileTest(&U,&V,&T,&Z); // returns intervals in
  uvtz
  // for 2D, UVT are not needed, for 3D UV are not needed, for 4D T
  // is not needed
  if(overlap) // did the tile actually overlap with the triangle?
  {
    loop over all boxes, B, in the uvt-cube that overlaps with the box
    defined by the intervals: U, V, T:
    {
      Zmin_triangle = ComputeZMinTri(B); // compute over the
      // current box, B
      Zmax = GetZMax(B);   // get Zmax from Zmax-
      // representation
      if(Zmin_triangle <= Zmax) return false;   // not occluded!
    }
  }
}
return true;
```

Figure 4:
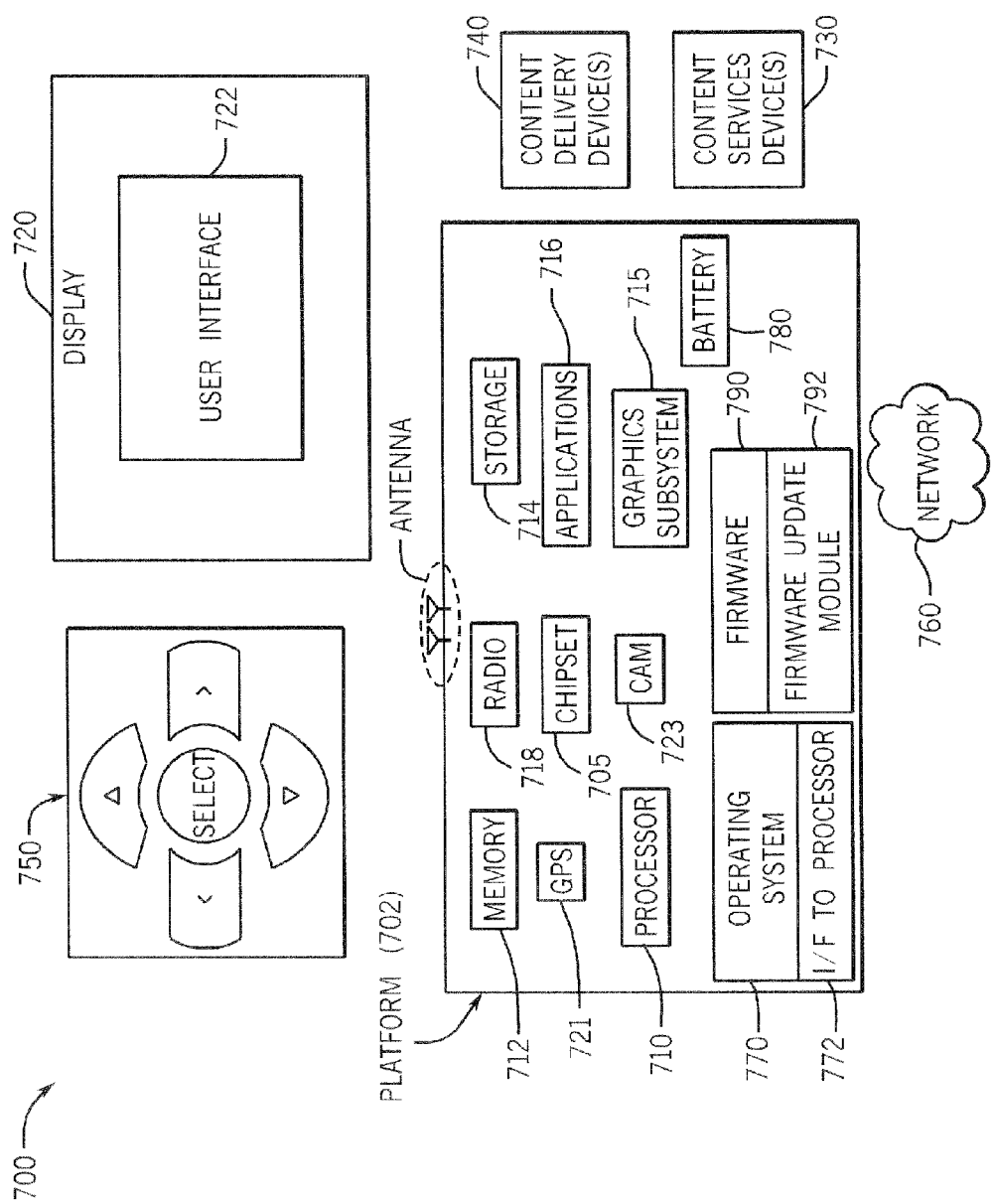
FIG. 4 is a system depiction of one embodiment.

FIG. 4 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716, global positioning system (GPS) 721, camera 723 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

In addition, the platform 702 may include an operating system 770. An interface to the processor 772 may interface the operating system and the processor 710.

Firmware 790 may be provided to implement functions such as the boot sequence. An update module to enable the firmware to be updated from outside the platform 702 may be provided. For example the update module may include code to determine whether the attempt to update is authentic and to identify the latest update of the firmware 790 to facilitate the determination of when updates are needed.

In some embodiments, the platform 702 may be powered by an external power supply. In some cases, the platform 702 may also include an internal battery 780 which acts as a power source in embodiments that do not adapt to external power supply or in embodiments that allow either battery sourced power or external sourced power.

The sequences shown in FIGS. 2 and 3 may be implemented in software and firmware embodiments by incorporating them within the storage 714 or within memory within the processor 710 or the graphics subsystem 715 to mention a few examples. The graphics subsystem 715 may include the graphics processing unit and the processor 710 may be a central processing unit in one embodiment.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 4.

As described above, system 700 may be embodied in varying physical styles or form factors. FIG. 4 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Figure 5:
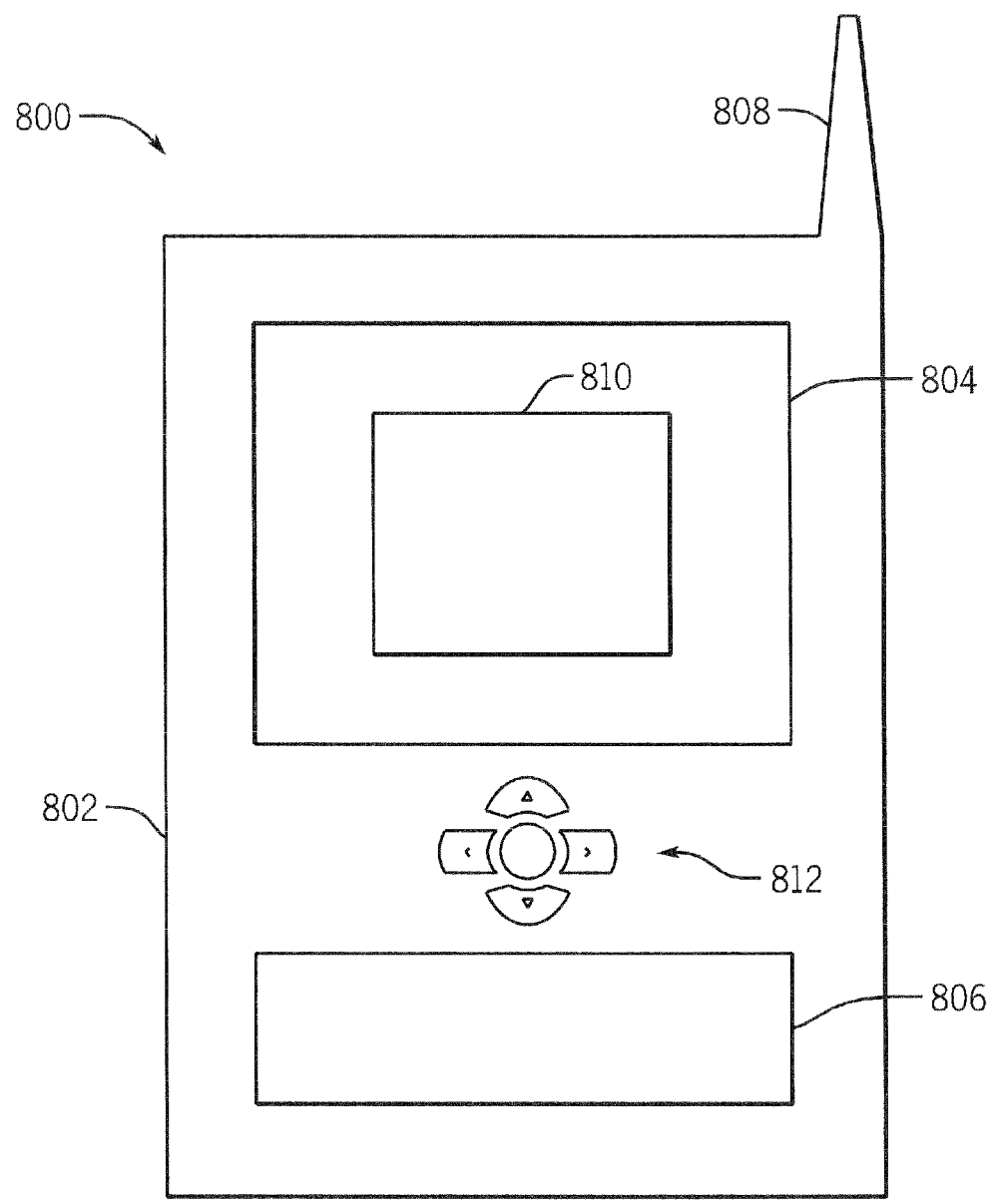
FIG. 5 is a front elevational view of one embodiment.

As shown in FIG. 5, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

The following clauses and/or examples pertain to further embodiments:

One example embodiment may be a method for traversing triangles within a tile for an occlusion query in a graphics processor; computing depth per sample; performing a depth test; counting the number of depth test passes versus number of fails; and using an occlusion query for five-dimensional rasterization for motion blur and depth of field. The method may also include using an occlusion query for occlusion culling. The method may also include a estimating minimum depth of a triangle over a tile, and comparing this minimum depth against the maximum depths of the hierarchical depth buffer. The method may also include a first maximum depth value is maximum depth over a first time interval and said second maximum depth value is a maximum depth over a second time interval. The method may also include traversing triangles within a tile for an occlusion query in a graphics processor; for each tile, computing intervals for lens, time and depth parameters; detecting which maximum depth values need to be considered using lens and time parameter intervals; comparing the depth of moving defocused triangles to maximum depth values that need to be considered; if all interval boxes are occluded, then determining a triangle is occluded for that tile; and if one comparison is false, then determining that a geometry may not be occluded and aborting the occlusion query. The method may also include performing the occlusion query in five dimensions. The method may also include performing the occlusion query in less than five dimensions. The method may also include traversing screen space using a selection of one of at least two tile sizes. The method may also include traversing screen space and selecting a tile size to reduce computations. The method may also include including traversing screen space by selecting a tile size to improve culling performance.

Another example embodiment may be at least one machine readable medium comprising a plurality of instructions and, in response to being executed on a computing device, causing the computing device to carry out a method according to any one of the above clauses.

Another example embodiment may be an apparatus comprising a processor to traverse triangles within a tile for an occlusion query, for each tile, computing intervals for lens, time and depth parameters, detect which maximum depth values need to be considered using lens and time parameter intervals, compare the depth of moving defocused triangles to maximum depth values that need to be considered, if all interval boxes are occluded, then determine a triangle is occluded for that tile if no one comparison is false, then determine that a geometry may not be occluded and aborting the occlusion query; and a memory coupled to said processor. The apparatus may include an operating system, a battery and firmware and a module to update said firmware. The apparatus may also include said processor to perform the occlusion query in five dimensions. The apparatus may also include said processor to perform the occlusion query in less than five dimensions. The apparatus may also include said processor to traverse screen space using a selection of one of at least two tile sizes. The apparatus may also include said processor to traverse screen space and select a tile size to reduce computations. The apparatus may also include said processor to traverse screen space by selecting a tile size to improve culling performance.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   traversing triangles within a tile for an occlusion query in a graphics processor;
   for that tile, computing intervals for lens, time and depth parameters; detecting which maximum depth values need to be considered using lens and time parameter intervals;
   comparing a depth of a moving defocused triangle to the maximum depth values that;
   if the depth of the moving defocused triangle is greater than all of the maximum depth values, then determining the triangle is occluded for that tile; and
   if the depth of the moving defocused triangle is less than or equal to one of the maximum depth values, then aborting the occlusion query for that tile.

2. The method of claim 1 including performing the occlusion query in five dimensions.

3. The method of claim 1 including performing the occlusion query in less than five dimensions.

4. The method of claim 1 including traversing screen space using a selection of one of at least two tile sizes.

5. The method of claim 1 including traversing screen space and selecting a tile size to reduce computations.

6. The method of claim 1 including traversing screen space by selecting a tile size to improve culling performance.

7. At least one non-transitory machine readable medium comprising a plurality of instructions and, in response to being executed on a computing device, causing the computing device to carry out a sequence comprising:
   traversing triangles within a tile for an occlusion query in a graphics processor;
   for that tile, computing intervals for lens, time and depth parameters; detecting which maximum depth values need to be considered using lens and time parameter intervals;
   comparing a depth of moving defocused triangle to the maximum depth values;
   if the depth of the moving defocused triangle is greater than all of the maximum depth values, then determining the triangle is occluded for that tile; and
   if the depth of the moving defocused triangle is less than or equal to one of the maximum depth values, then aborting the occlusion query for that tile.

8. The medium of claim 7 including performing the occlusion query in five dimensions.

9. The medium of claim 7 including performing the occlusion query in less than five dimensions.

10. The medium of claim 7 including traversing screen space using a selection of one of at least two tile sizes.

11. The medium of claim 7 including traversing screen space and selecting a tile size to reduce computations.

12. The medium of claim 7 including traversing screen space by selecting a tile size to improve culling performance.

13. An apparatus comprising:
   a processor to traverse triangles within a tile for an occlusion query, for that tile, computing intervals for lens, time and depth parameters, detect which maximum depth values need to be considered using lens and time parameter intervals, compare a depth of a moving defocused triangles to the maximum depth values, if the depth of the moving defocused triangle is greater than all of the maximum depth values, then determine the triangle is occluded for that tile, if the depth of the moving defocused triangle is less than or equal to one of the maximum depth values, then aborting the occlusion query for that tile; and a memory coupled to said processor.

14. The apparatus of claim 13 including an operating system.

15. The apparatus of claim 13 including a battery.

16. The apparatus of claim 13 including firmware and a module to update said firmware.

17. The apparatus of claim 13, said processor to perform the occlusion query in five dimensions.

18. The apparatus of claim 13, said processor to perform the occlusion query in less than five dimensions.

19. The apparatus of claim 13, said processor to traverse screen space using a selection of one of at least two tile sizes.

20. The apparatus of claim 13, said processor to traverse screen space and select a tile size to reduce computations.

21. The apparatus of claim 13, said processor to traverse screen space by selecting a tile size to improve culling performance.

* * * * *